United States Patent
Jones et al.

(10) Patent No.: US 7,603,128 B1
(45) Date of Patent: Oct. 13, 2009

(54) SYSTEM AND METHOD FOR WIRELESS DISTRIBUTION OF LOCATION-BASED INFORMATION IN AN ENCLOSURE

(75) Inventors: Bryce A. Jones, Overland Park, KS (US); John M. Everson, Kansas City, MO (US); Jason R. Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 621 days.

(21) Appl. No.: 10/457,603

(22) Filed: Jun. 9, 2003

(51) Int. Cl.
*H04W 24/00* (2009.01)
*H04M 3/42* (2006.01)

(52) U.S. Cl. ............... 455/456.1; 455/456.6; 455/414.2

(58) Field of Classification Search ............. 455/67.16, 455/414.2, 456, 457, 418, 419, 420, 404.2, 455/408, 456.1, 456.6
See application file for complete search history.

(56) References Cited

U.S. PATENT DOCUMENTS

| | | | | |
|---|---|---|---|---|
| 5,974,312 A * | 10/1999 | Hayes et al. | ................ | 455/419 |
| 5,990,826 A * | 11/1999 | Mitchell | ................ | 342/357.06 |
| 6,141,542 A * | 10/2000 | Kotzin et al. | ................ | 455/101 |
| 6,295,449 B1 * | 9/2001 | Westerlage et al. | ...... | 455/422.1 |
| 6,456,852 B2 * | 9/2002 | Bar et al. | ................ | 455/456.1 |
| 6,473,038 B2 * | 10/2002 | Patwari et al. | ............... | 342/450 |
| 6,560,462 B1 * | 5/2003 | Ravi et al. | ............... | 455/456.1 |
| 6,657,549 B1 * | 12/2003 | Avery | ................... | 340/825.49 |
| 6,748,226 B1 * | 6/2004 | Wortham | ................ | 455/456.6 |
| 6,898,434 B2 * | 5/2005 | Pradhan et al. | .......... | 455/456.1 |
| 6,985,812 B2 * | 1/2006 | Sweetapple | ................ | 701/214 |
| 7,027,808 B2 * | 4/2006 | Wesby | ........................ | 455/419 |
| 7,313,401 B2 * | 12/2007 | Karmel | .................... | 455/456.1 |
| 2001/0014597 A1 * | 8/2001 | Takiguchi et al. | .......... | 455/343 |
| 2002/0164995 A1 * | 11/2002 | Brown et al. | ................. | 455/456 |
| 2002/0177476 A1 * | 11/2002 | Chou | ........................ | 455/574 |
| 2002/1016499 * | 11/2002 | Brown et al. | ................ | 455/456 |

OTHER PUBLICATIONS

Goran M. Djuknic and Robert E. Richton, "*Geolocation and Assisted—GPS*," Lucent White Paper, 2000.

* cited by examiner

*Primary Examiner*—Sonny Trinh

(57) ABSTRACT

A system for providing coordinate-based location information may include first, second and third wireless location transmitters. The wireless location transmitters may be located at fixed positions within an enclosure, such as a building. The wireless locations transmitters may each be programmed with a respective coordinate-based location, which the wireless location transmitters can in turn wirelessly transmit to a wireless device. The wireless device can then use the three respective coordinated-based locations of the wireless location transmitters to determine a coordinate-based location for the wireless device.

28 Claims, 5 Drawing Sheets

SYSTEM AND METHOD FOR WIRELESS DISTRIBUTION OF LOCATION-BASED INFORMATION IN AN ENCLOSURE

FIELD OF THE INVENTION

This invention relates generally to the distribution of wireless signals in an enclosure. More specifically, it relates to a system and method for wireless distribution of location-based information in an enclosure.

BACKGROUND OF THE INVENTION

A wireless device may use its current location for a variety of different purposes. For example, the wireless device's current location can be used to access one or more databases of shops, restaurants and other attractions within the vicinity of the wireless device, which can then be presented to a user of the wireless device. In another example, the wireless device's current location may be used to provide travel directions to the user of the wireless device. In another example, the wireless device's current location may be used in conjunction with emergency services, such when the wireless device's current location is provided to an operator as part of an E911 call. This list is not exhaustive, and the wireless device's current location may be used for many other purposes.

The Global Positioning System ("GPS") is one coordinate-based location system that is commonly used by wireless devices to determine their respective locations. GPS is a satellite navigation system in which multiple satellites orbiting the earth transmit location information to wireless devices. The GPS satellites typically transmit low-power signals (e.g., approximately 20 W) to GPS receivers in the wireless devices. Depending on the time of day and the location of a wireless device, the wireless device may receive GPS signals from approximately four to eleven GPS satellites.

GPS satellites transmit using two different carrier signals—an L1 signal at 1575.42 MHz and an L2 signal at 1227.60 MHz. A coarse acquisition ("C/A") code and a precise ("P") code are modulated on the L1 carrier. The L2 code is modulated by either the P code or the C/A code, although typically the P code is used. The C/A code is a pseudo random binary code that repeats every 1023 bits, which is approximately every millisecond. Each GPS satellite uses a different C/A code, thereby allowing GPS receivers to distinguish between signals transmitted from different satellites. The P code is a very long pseudo random binary noise code, which repeats approximately every seven days.

GPS is available for both civilian and government use. The C/A codes are generally known, and they can be used in civilian applications to determine the GPS location of a wireless device. The P codes are generally not publicly known, and they may even optionally be encrypted to provide additional security. Therefore, the P codes are generally only used in military and other government applications. The P codes can be used in conjunction with the C/A codes to provide increased precision over a GPS location that is derived using only the C/A codes.

The L1 carrier is additionally modulated with a navigation data message. The navigation data message includes information describing the orbit of the GPS satellite, clock data and an approximate guide to the orbits of other GPS satellites. The GPS satellite transmits the navigation data message in 1500 bit data frames, which are further divided into five 300 bit subframes. A complete navigation data message takes twenty-five frames, which are sent by the GPS satellite over an approximately twelve and a half minute period.

The clock data in the navigation data message describes the GPS satellite's clock in relation to Universal Coordinated Time ("UTC"), an international time standard used by the GPS satellites and GPS receivers. The GPS satellite can embed within the data navigation message the time that each subframe was transmitted by the GPS satellite. The GPS receiver can then record the time that each subframe was received from the GPS satellite, thereby allowing the GPS receiver to determine the length of time it took the subframe to travel from the GPS satellite to the GPS receiver. Using this length of time and the position of the satellite, the GPS receiver can extrapolate its distance from the GPS satellite.

As a GPS receiver typically receives information from four or more GPS satellites, the GPS receiver can determine its distance from four known locations. Once the GPS receiver determines its distance from the four GPS satellites, it can extrapolate its GPS location in three dimensions. If the GPS receiver knows its distance from more than four GPS satellites, it can use this additional information to build redundancy and error correction into its location computation.

While GPS allows a wireless device to effectively determine its current location, GPS has limitations. Since GPS satellites transmit their location information using low-power signals, these signals are subject to atmospheric interference. The signals may additionally be degraded due to obstructions in the transmission path between the GPS satellite and the GPS receiver. For example, the 1575.42 MHz GPS signal does not penetrate well through buildings, trees, caves, cars or other such enclosures or obstructions.

As these signals do not penetrate well through enclosures, a wireless device that is not near a window or other opening in the enclosure may then have a difficult time detecting the GPS signals from the orbiting GPS satellites. As a wireless device moves further within the interior of the enclosure, this problem compounds. Consequently, a wireless device located within an enclosure might not be able to detect the GPS signals from the orbiting satellites and, therefore, would be unable to determine its GPS location at all.

Therefore, there exists a need for an improved system and method for allowing a device located within an enclosed area to determine its position in a coordinate-based location system.

SUMMARY OF THE INVENTION

A system for providing coordinated-based location information may include first, second and third wireless location transmitters. One or more of the wireless location transmitters may be located within an enclosure, such as a building. Each of the wireless location transmitters may be programmed with location information indicative of its respective location in a coordinate-based location system. The wireless location transmitters may wirelessly transmit their respective location information to a wireless device.

The wireless device may also, for example, be located within the enclosure. The wireless device may receive the location information from the three wireless location transmitters. The wireless device may also determine its distance from the wireless location transmitters. The wireless device may then extrapolate its location in the coordinate-based location system. For example, the wireless location transmitters may transmit respective GPS locations, thereby allowing the wireless device to determine its GPS location.

Using information from the three wireless location transmitters, the wireless device can extrapolate its location in two dimensions. In alternate embodiments the system may include four or more wireless location transmitters, thereby allowing the wireless device to determine its location in three dimensions. In other embodiments the wireless location transmitters may be mounted to fixed locations in the enclosure, such as on walls or ceilings of the enclosure. In still other embodiments, one or more of the wireless location transmitters may be Institute of Electrical and Electronics Engineers ("IEEE") 802.11x access points, thereby providing connectivity to an IEEE 802.11x network in addition to transmitting location information.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
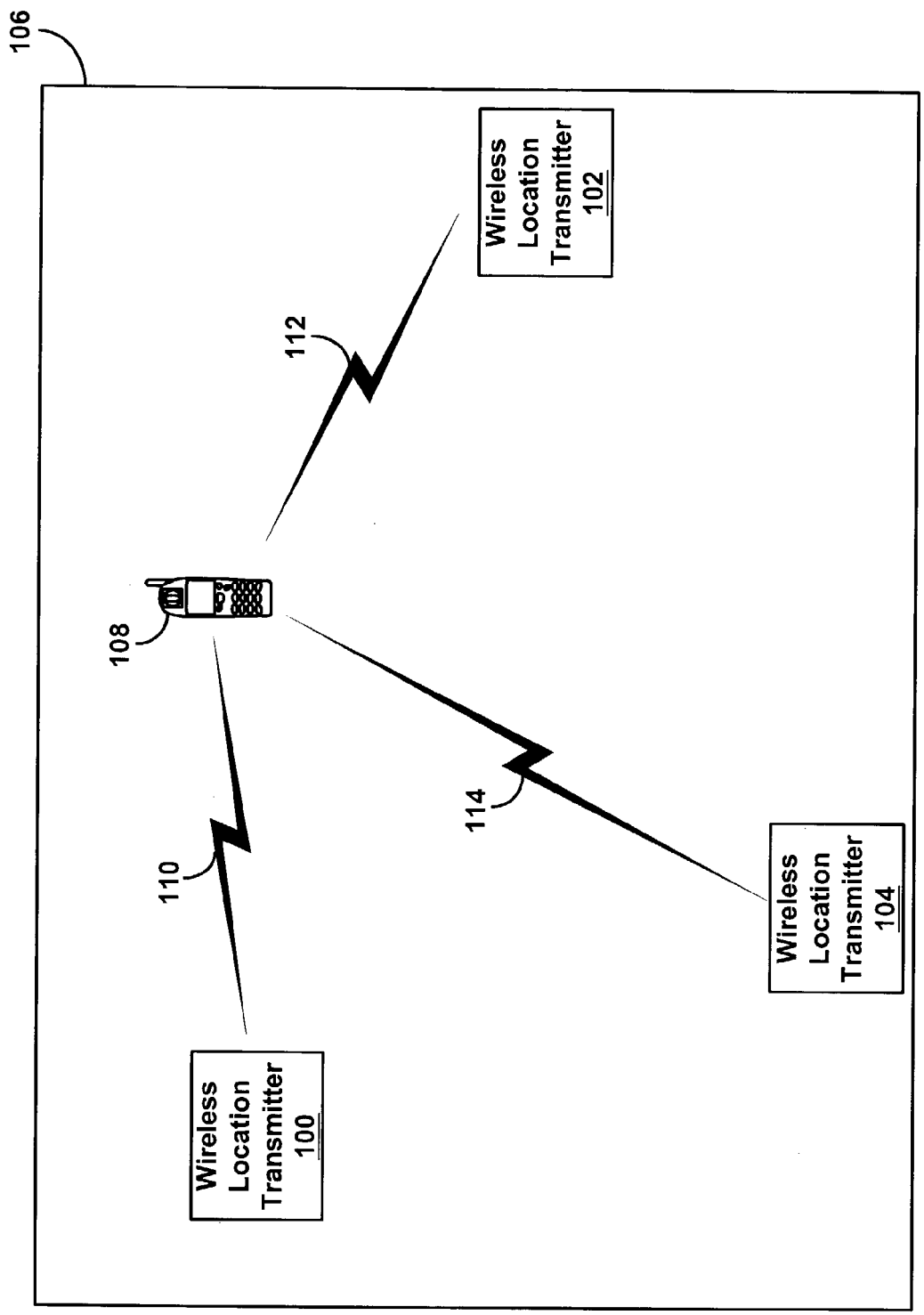
FIG. 1 is an exemplary embodiment of a system using multiple wireless location transmitters to transmit coordinate-based location information to a wireless device located within an enclosure.

FIG. 1 is an exemplary embodiment of a system using multiple wireless location transmitters to transmit coordinate-based location information to a wireless device located within an enclosure. As shown in FIG. 1, a first wireless location transmitter 100, a second wireless location transmitter 102 and a third wireless location transmitter 104 are located within an enclosure 106. While FIG. 1 depicts three wireless location transmitters 100, 102, 104, alternate embodiments may use a greater or fewer number of wireless location transmitters.

The enclosure 106 may be any fully enclosed or partially enclosed area. For example, the enclosure 106 may be a building, such as a home or office. The wireless location transmitters 100, 102, 104 may be located at various different positions within the enclosure 106. For example, the enclosure 106 may be a building, and the wireless transmitters 100, 102, 104 may all be located within the same room of the building. Alternatively, some wireless location transmitters may be located in one room, while other wireless location transmitter may be located in other rooms.

The wireless location transmitters 100, 102, 104 may be positioned at fixed locations within the enclosure 106. For example, the wireless location transmitters 100, 102, 104 may be mounted at different respective locations within a particular room or other area of the enclosure 106. In one example, one or more of the wireless location transmitters 100, 102, 104 might be mounted to ceiling of a room in the enclosure 106. In another example, one or more of the wireless location transmitters 100, 102, 104 might be mounted to a wall of the enclosure 106 or within a wall of the enclosure 106. These examples are not exhaustive, and the wireless location transmitters 100, 102, 104 might be mounted at other locations within the enclosure 106 as well.

The wireless location transmitters 100, 102, 104 may include an internal power source, such as a battery. The battery may be a rechargeable battery or a non-rechargeable battery. Alternatively, the wireless location transmitters 100, 102, 104 may be hardwired to an external power source. Still alternatively, the wireless location transmitters 100, 102, 104 may include both internal and external power sources. It is not necessary, however, that all the wireless location transmitters 100, 102, 104 be powered in the same manner. Thus, some wireless location transmitters might only have internal or external power sources, while others might have both.

The wireless location transmitters 100, 102, 104 may wirelessly communicate with a wireless device 108. The wireless device 108 may be any type of wireless device, such as a mobile phone, a two-way pager, a personal digital assistant ("PDA"), a wirelessly equipped computer or another type of wireless device. As depicted in FIG. 1, the first wireless location transmitter 100 may communicate with the wireless device 108 over a first wireless interface 110, the second wireless location transmitter 102 may communicate with the wireless device 108 over a second wireless interface 112, and the third wireless location transmitter 104 may communicate with the wireless device 108 over a third wireless interface 114.

The wireless location transmitters 100, 102, 104 may communicate with the wireless device 108 via the wireless interfaces 110, 112, 114 using any wireless protocol. For example, the wireless location transmitters 100, 102, 104 may communicate with the wireless device 108 using any of the IEEE 802.11x standards, such as 802.11a, 802.11b, 802.11g or others. Alternatively, HomeRF, HiperLAN, Multipoint Microwave Distribution System ("MMDS"), Bluetooth, code division multiple access ("CDMA"), frequency division multiple access ("FDMA"), time division multiple access ("TDMA") or other wireless protocols may be used.

The wireless location transmitters 100, 102, 104 may each have a respective location in a coordinate-based location system, and each wireless location transmitter 100, 102, 104 may be programmed with data indicative of its respective location in the coordinate-based location system. For example, the wireless location transmitters 100, 102, 104 may have respective GPS locations and may each be programmed with data indicative of its respective GPS location. GPS is merely one example, and other coordinate-based location systems may be used as well.

In an alternate embodiment, the wireless locations transmitters 100, 102, 104 might communicate with GPS satellites to determine their respective GPS locations. Thus, the wireless location transmitters 100, 102, 104 might determine their GPS locations directly from the satellites rather than being programmed with data indicative of their respective GPS locations. Alternatively, the wireless location transmitters 100, 102, 104 might be programmed with data indicative of their respective GPS locations in addition to communicating with GPS satellites. The wireless locations transmitters 100, 102, 104 might then use the signals from the GPS satellite to determine their respective GPS locations; however, if the wireless locations transmitters 100, 102, 104 were unable to receive signals from the GPS satellites, they may then rely on the programmed data indicative of their respective GPS locations.

In another embodiment, the wireless location transmitters 100, 102, 104 might rely on the programmed data to use as their current GPS locations. The wireless location transmitters 100, 102, 104 may periodically attempt to use the GPS satellites to also determine their GPS locations. If the two locations are different, then the wireless location devices 100, 102, 104 may then rely on the GPS location determined using the GPS satellites. The wireless location devices 100, 102, 104 might also update their programmed GPS locations to use the more current GPS locations determined using the GPS satellites. Other variations are possible as well.

The wireless location transmitters 100, 102, 104 may transmit their respective locations in the coordinate-based location system to the wireless device 108. Thus, the wireless device 108 may receive three different coordinate-based locations— one from each of the wireless location transmitters 100, 102, 104. The wireless device 108 can then use the coordinate-based locations of the wireless location transmitters 100, 102, 104 to determine its own location in the coordinate-based location system.

As previously described, the wireless location transmitters 100, 102, 104 may use a variety of different location-based systems, such as GPS. Alternatively, the wireless location transmitters 100, 102, 104 may use other standardized location-based systems, or they may use proprietary location-based systems. In addition, the wireless location transmitters 100, 102, 104 may transmit their respective locations using a variety of different methods.

For example, the wireless location transmitters 100, 102, 104 may transmit GPS locations, and they may use the same standardized packet format used by GPS satellites. Alternatively, the wireless location transmitters 100, 102, 104 may transmit their respective GPS locations, but they may use a different packet format than the standardized packet format used by GPS. For other standardized location-based systems, the wireless location transmitters 100, 102, 104 may use the standardized packet formats of their respective location-based system or they may use other their own non-standardized packet formats.

As previously described, the wireless location transmitters 100, 102, 104 may transmit their respective locations to the wireless device 108 using a variety of different wireless protocols. The wireless protocols may provide enhanced transmission properties through the enclosure over the low-power GPS signals that are transmitted from GPS satellites. This can allow wireless devices located within the enclosure to more easily detect the signals transmitted by the wireless location transmitters 100, 102, 104 than the wireless devices can detect the signals transmitted by GPS satellites.

Therefore, in locations where the wireless devices would be unable to detect signals from GPS satellites, the wireless devices might still be able to detect signals from the wireless location transmitters 100, 102, 104. Additionally, the power levels of the wireless location transmitters 100, 102, 104 may be adjusted in order to increase or decrease the range of their respective signals through the enclosure 106, thereby providing increased or decreased coverage to wireless devices located in the enclosure 106.

In an alternate embodiment, one or more of the wireless location transmitters 100, 102, 104 may themselves be networked together. For example, the wireless location transmitters 100, 102, 104 may be networked via an Ethernet or other type of network. Alternatively, proprietary or dedicated connections may be used. In one embodiment, the wireless location transmitters 100, 102, 104 have hardwired connections to the network, and in another embodiment the wireless location transmitters 100, 102, 104 have wireless connections to the network. It should be understood, however, that not all wireless location transmitters 100, 102, 104 necessarily connect to network in the same manner and some wireless location transmitters might not connect to the network at all.

Once connected to the network, the wireless location transmitters 100, 102, 104 may be remotely administered, such as via a computer or other device on the network. This can advantageously allow multiple wireless location transmitters to be remotely administered from a central location. For example, one or more of the wireless location transmitters 100, 102, 104 may be enabled or disabled. In another example, one or more of the wireless location transmitters 100, 102, 104 may be moved to a different location and therefore have different GPS coordinates. The programmed GPS location of the wireless locations transmitters 100, 102, 104 may then be remotely changed. In yet another example, one or more of the wireless location transmitters 100, 102, 104 may have its time reference adjusted. Other changes may also be made via remote administration. It should also be understood that these or other changes might also be made at the wireless location transmitted 100, 102, 104 itself instead of through remote administration.

In another embodiment, one or more of the wireless location transmitters 100, 102, 104 may be used to configure the other wireless location transmitters 100, 102, 104. Thus, by interfacing the wireless location transmitters 100, 102, 104 together, such as through a network, one wireless location transmitter can be used to configure other wireless location transmitters. It is not necessary, however, that the wireless location transmitters 100, 102, 104 be interfaced with each other through a network. They may alternatively be directly connected to each other through wired or wireless connections.

Figure 2:
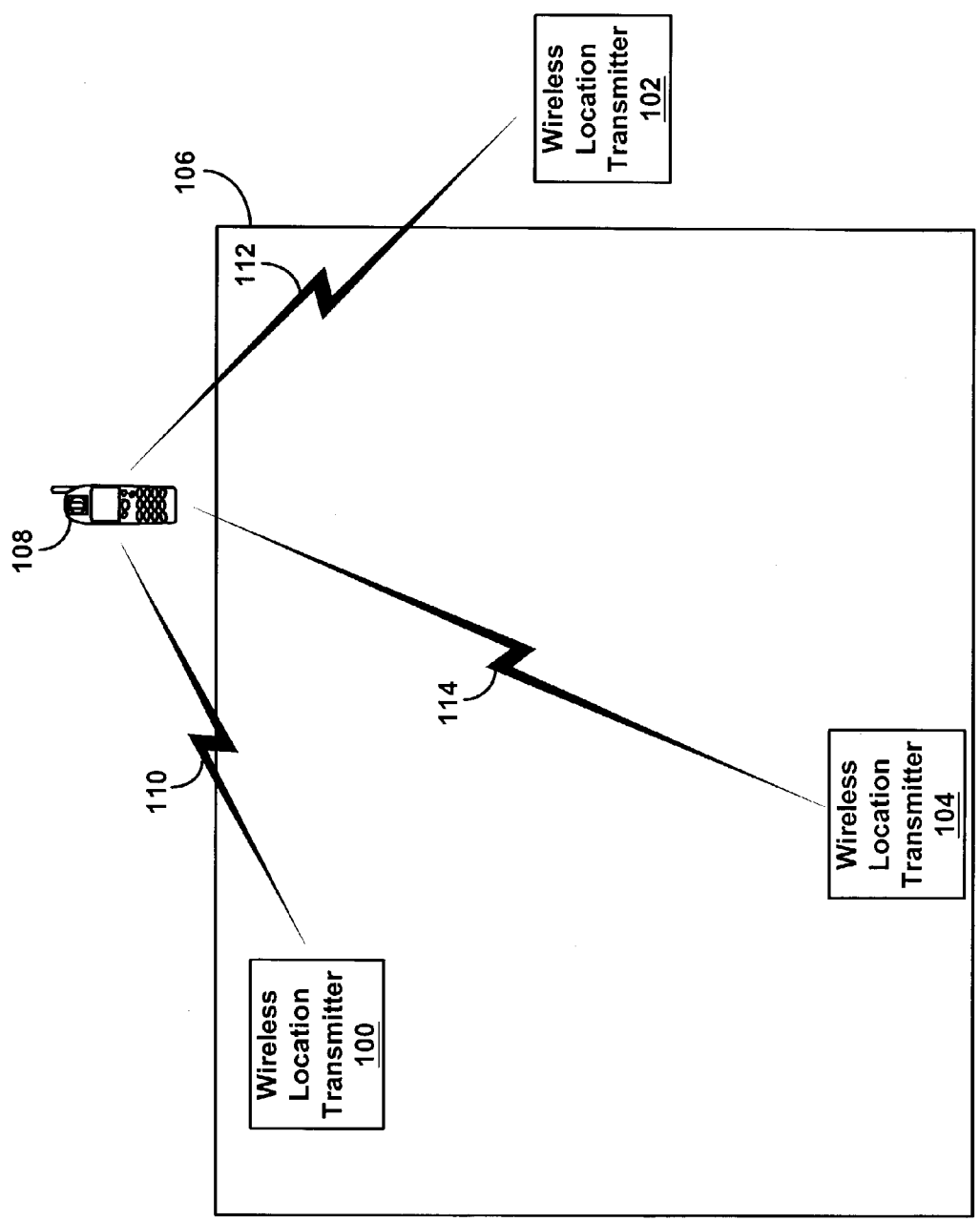
FIG. 2 is an alternate embodiment of the system of FIG. 1, in which one of the wireless location transmitters and the wireless device are both located outside the enclosure.

FIG. 2 is an alternate embodiment of the system of FIG. 1, in which one of the wireless location transmitters and the wireless device are both located outside the enclosure. As shown in FIG. 2, it is not necessary that the wireless location transmitters 100, 102, 104 and the wireless device 108 are all located within the enclosure 106. In alternate embodiments, one or more of the wireless location transmitters 100, 102, 104 may be located outside the enclosure 106. Also, when the wireless device 108 is located outside the enclosure, it may still communicate with one or more of the wireless location transmitters 100, 102, 104 in order to determine its current location.

As shown in FIG. 2, the second wireless location transmitter 102 and the wireless device 108 are both located outside the enclosure 106. The first wireless location transmitter 100 and the third wireless location transmitter 104 are located inside the enclosure 106. The wireless device 108 may then communicate with the first, second and third location transmitters 100, 102, 104 via the first, second and third wireless interfaces 110, 112, 114. The wireless device 108 may then use the information it receives from the wireless location transmitters 100, 102, 104 in order to determine its current location.

Figure 3:
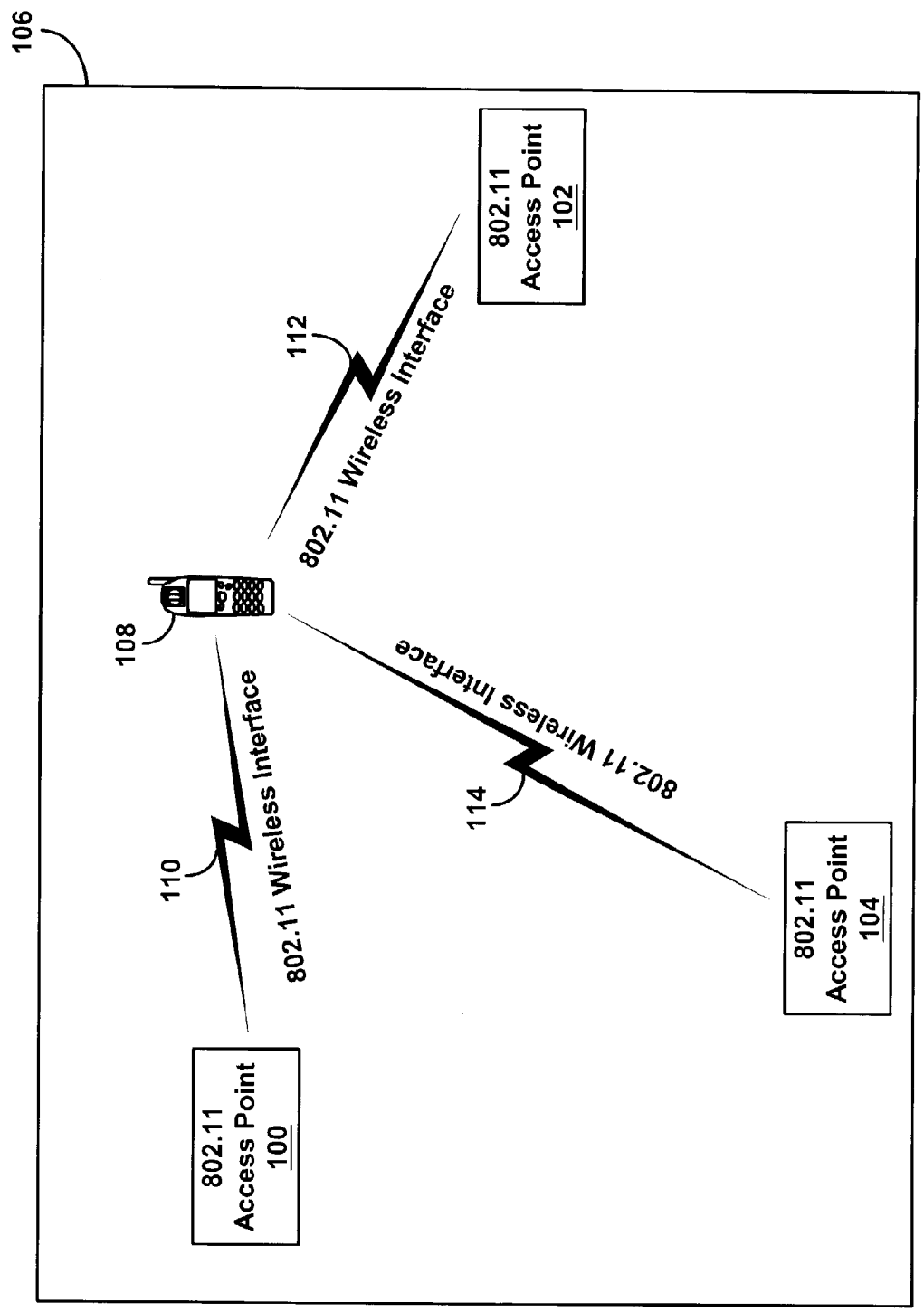
FIG. 3 is an alternate embodiment of the system of FIG. 1, in which the wireless locations transmitters are access points in an IEEE 802.11x network.

FIG. 3 is an alternate embodiment of the system of FIG. 1, in which the wireless location transmitters are access points in an 802.11x network. In addition to transmitting location information, the wireless location transmitters 100, 102, 104 may provide other functionality. For example, one or more of the wireless location transmitters 100, 102, 104 may be access points in an 802.11x network. As depicted in FIG. 3, all three wireless location transmitters 100, 102, 104 are 802.11x access points. In other embodiments, however, a greater or fewer number of wireless location transmitters may be 802.11 access points.

As shown in FIG. 3, the wireless device 108 and the 802.11x access points 100, 102, 104 communicate over their respective wireless interfaces 110, 112, 114 using one of the IEEE 802.11x protocols. Thus, the first, second and third wireless interfaces 110, 112, 114 would each be an 802.11 interface. The first, second and third 802.11 access points 100, 102, 104 may then transmit their respective locations to the wireless device 108 via the IEEE 802.11x wireless interfaces 110, 112, 114. The wireless device 108 can receive the locations of the first, second and third 802.11 access points 100, 102, 104.

The wireless device 108 may additionally associate with one of the 802.11 access points, which can in turn provide the wireless device 108 with connectivity to an 802.11 network. The IEEE 802.11x access points 100, 102, 104 may broadcast their respective location information so that wireless devices 108 that are not associated with the 802.11 access points 100, 102, 104 can receive the location information. Therefore, it would not be necessary that the wireless device 108 associate with an IEEE 802.11x access point in order to receive the access point's location information.

Figure 4:
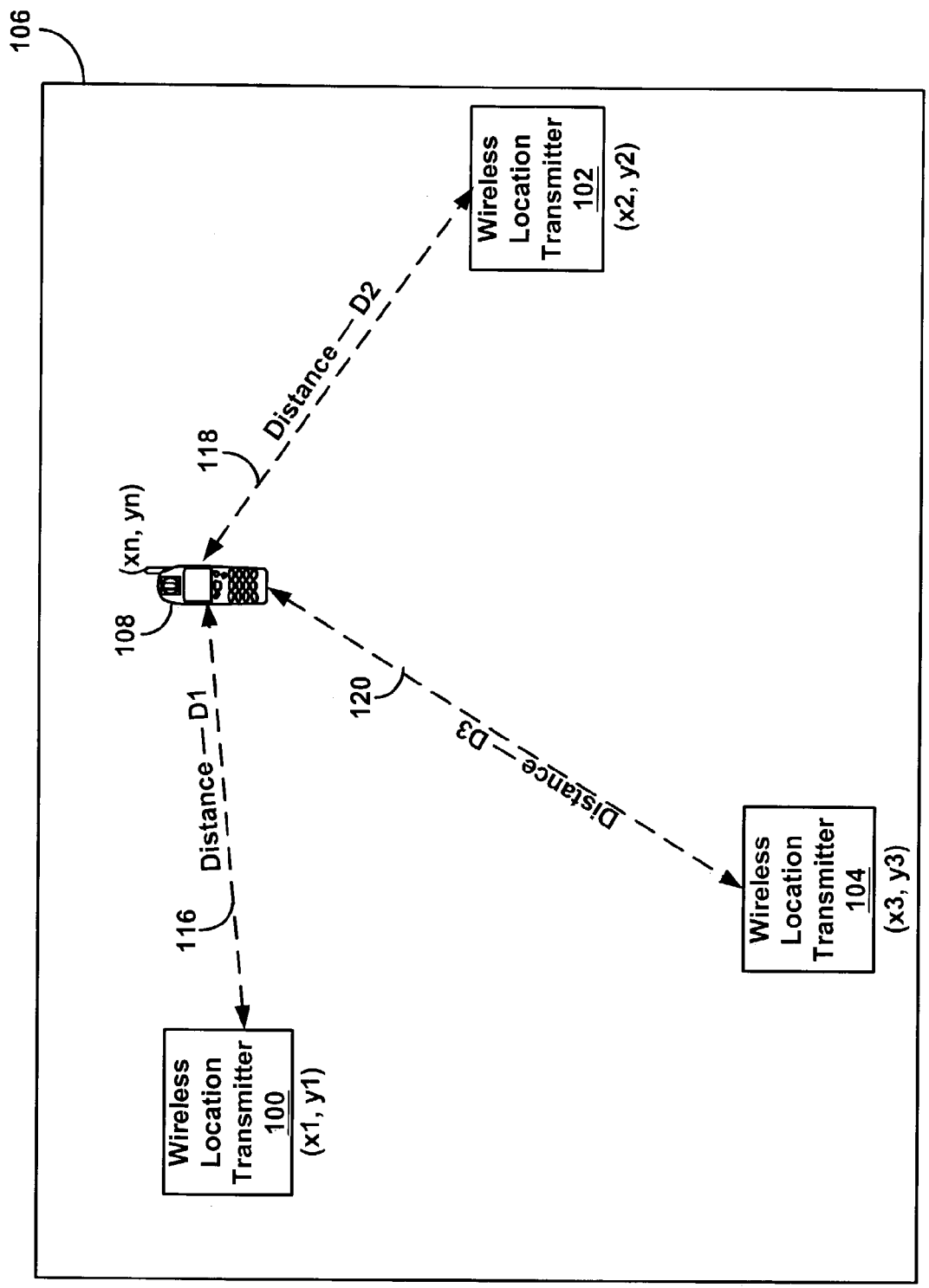
FIG. 4 is a block diagram of the system of FIG. 1 illustrating exemplary calculations by the wireless device in order to determine its location.

FIG. 4 is a block diagram of the system of FIG. 1 illustrating exemplary calculations by the wireless device in order to determine its location. As shown in FIG. 1, the first wireless location transmitter 100 is located at coordinates (x1, y1) in a coordinate-based location system. The second wireless location transmitter 102 is located at coordinates (x2, y2), and the third wireless location transmitter 104 is located at coordinates (x3, y3). While the coordinate-based system depicted in FIG. 4 uses two dimensions to describe locations, alternate coordinate-based systems might use three dimensions to describe locations.

The wireless device 108 may receive the coordinates of the first wireless location transmitter 100. The wireless device 108 may then determine the distance between itself and the first wireless location transmitter 100. As illustrated by a dashed line 116, the first wireless location transmitter is a distance of D1 from the wireless device 108. The wireless device 108 may similarly receive coordinates of the second and third wireless location transmitters 102, 104, and it may also determine its distance from the second and third wireless location transmitters 102, 104. A dashed line 118 illustrates that the second wireless location transmitter 102 is located a distance D2 from the wireless device, and a dashed line 118 illustrates that the third wireless location transmitter 104 is located a distance D3 from the wireless device 108.

The wireless device 108 may determine the distance between itself and the wireless location transmitters 100, 102, 104 in a variety of different ways. For example, the wireless locations transmitters 100, 102, 104 and the wireless device 108 may be synchronized to a common time reference, such as UTC. In addition to sending their respective coordinates to the wireless device 108, the wireless location transmitters 100, 102, 104 may also send the time that the coordinates were transmitted to the wireless device 108. For example, a wireless location transmitter may send one or more packets to the wireless device 108, and the packets may include the coordinates of the wireless location transmitter and also the time that the wireless location transmitter sent the packet to the wireless device 108.

When the wireless device 108 receives a packet from a wireless location transmitter, the wireless device 108 may then note the time that the packet was received by the wireless device 108. If the packet includes the time that it was sent by the wireless location transmitter, the wireless device 108 can then determine how long it took the packet to travel from the wireless location transmitter to the wireless device 108. Based on the time it took the packet to travel from the wireless location transmitter to the wireless device 108, the wireless device 108 can then determine the distance the packet traveled, and thereby also determine the distance from the wireless location transmitter to the wireless device 108.

Once the wireless device 108 knows the coordinates of the wireless location transmitters 100, 102, 104 and also its respective distances from the wireless location transmitters 100, 102, 104, the wireless device 108 can triangulate its position in the coordinate-based location system. Using coordinates from the three wireless location transmitters 100, 102, 104, the wireless device 108 can determine its location in two dimensions. If the wireless device 108 receives coordinates from more than three wireless location transmitters, the wireless device 108 may use the additional coordinates for redundancy in performing the computations. Additionally, receiving coordinates from more than three wireless location transmitters may allow the wireless device 108 to compute its location in three dimensions.

Figure 5:
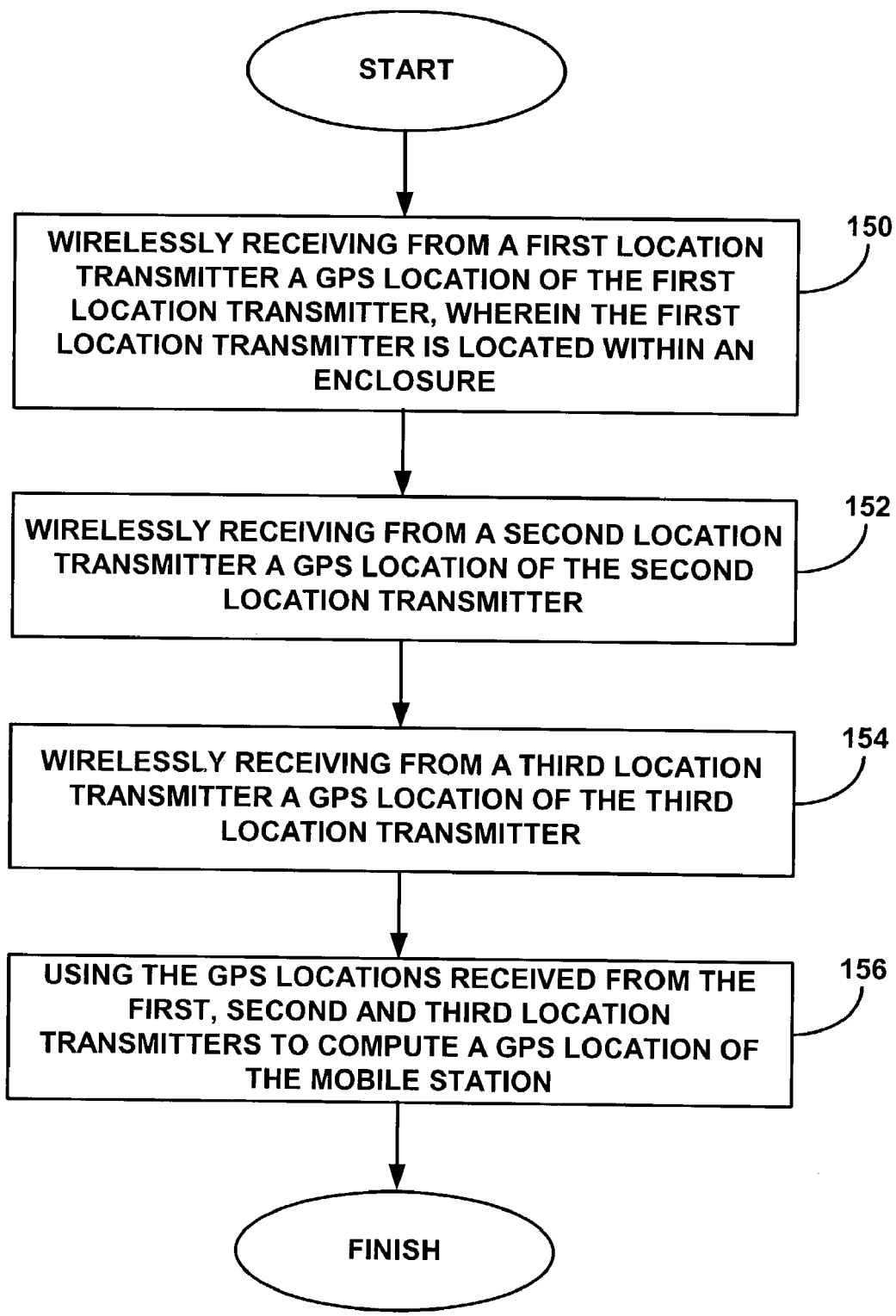
FIG. 5 is a flowchart of an exemplary process a wireless device may use to determine its location in a coordinate-based location system.

FIG. 5 is a flowchart of an exemplary process a wireless device may use to determine its location in a coordinate-based location system. At Step 150, the wireless device wirelessly receives from a first location transmitter a GPS location of the first location transmitter, where the first location transmitter is located within an enclosure. At Step 152, the wireless device wirelessly receives from a second location transmitter a GPS location of the second location transmitter. At Step 154, the wireless device wirelessly receives from a third location transmitter a GPS location of the third location transmitter. Then, at Step 156, the wireless device uses the GPS location of the first, second and third location transmitters to compute a GPS location of the wireless device.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A system for providing location information to a wireless device, the system comprising: first, second and third wireless location transmitters, wherein each wireless location transmitter is positioned at a different fixed location, wherein each wireless location transmitter has a respective location in a coordinate-based location system, wherein each wireless location transmitter is programmed with data indicative of its respective location in the coordinate-based location system, and wherein each wireless location transmitter transmits its respective coordinate-based location to a wireless device; and
means for remotely changing the respective locations programmed in any of the wireless location transmitters and for remotely enabling and disabling any of the wireless location transmitters.

2. The system of claim 1, wherein the location transmitters are all located within an enclosure, and wherein wireless location transmitters are mounted at different respective locations within the enclosure.

3. The system of claim 2, wherein at least one of the wireless location transmitters is mounted to a ceiling of the enclosure.

4. The system of claim 2, wherein at least one of the wireless location transmitters is mounted to a wall of the enclosure.

5. The system of claim 1, wherein at least one of the wireless location transmitters has an internal power source.

6. The system of claim 5, wherein the internal power source is a battery.

7. The system of claim 1, wherein at least one of the wireless location transmitters is connected to an external power source.

8. The system of claim 1, wherein the wireless location transmitters wirelessly transmit their respective coordinate-based locations using a wireless local area network (WLAN) protocol.

9. The system of claim 1, wherein at least one of the wireless location transmitters is a wireless local area network (WLAN) access point.

10. The system of claim 1, wherein the wireless device is a mobile phone, a two-way radio, a two-way pager or a computer.

11. The system of claim 1, wherein the respective coordinate-based locations of the wireless location transmitters are GPS locations.

12. A system for propagating GPS signals inside a building, the system comprising:
a first wireless location transmitter for wirelessly transmitting a GPS location of the first location transmitter to a wireless device, wherein the GPS location of the first location transmitter is programmed into the first location transmitter, and wherein the first location transmitter is disposed within the building;
a second wireless location transmitter for wirelessly transmitting a GPS location of the second location transmitter to the wireless device, wherein the GPS location of the second location transmitter is programmed into the second location transmitter, and wherein the second location transmitter is also disposed within the building;
a third wireless location transmitter for wirelessly transmitting a GPS location of the third location transmitter to the wireless device, wherein the GPS location of the third location transmitter is programmed into the third location transmitter, and wherein the third location transmitter is also disposed within the building; and
means for remotely changing the respective locations programmed in any of the wireless location transmitters and for remotely enabling and disabling any of the wireless location transmitters.

13. The system of claim 12, wherein the first, second and third wireless location transmitters wirelessly transmit their respective GPS locations using a wireless local area network (WLAN) protocol.

14. The system of claim 12, wherein at least one of the wireless location transmitters is affixed to a ceiling of the building.

15. The system of claim 12, wherein at least one of the wireless location transmitters is affixed to a wall of the building.

16. A method for determining a location of a wireless device in a coordinate-based location system, the method comprising:
wirelessly receiving from a first location transmitter a first packet that includes a location of the first location transmitter and a time that the first packet was transmitted by the first location transmitter, wherein the first location transmitter is located within an enclosure;
wirelessly receiving from a second location transmitter a second packet that includes a location of the second location transmitter and a time that the second packet was transmitted by the second location transmitter;
wirelessly receiving from a third location transmitter a third packet that includes a location of the third location transmitter and a time that the third packet was transmitted by the third location transmitter; and
using the locations received from the first, second and third location transmitters to compute a location of the wireless device.

17. A computer readable medium having stored therein instructions for causing a processor to execute the method of claim 16.

18. The method of claim 16, wherein the locations received from the location transmitters are GPS locations.

19. The method of claim 16, further comprising:
recording a time that the first packet was received at the wireless device;
recording a time that the second packet was received at the wireless device; and
recording a time that the third packet was received at the wireless device.

20. The method of claim 19, further comprising:
using the time that the first packet was transmitted from the first location transmitter and the time that the first packet was received at the wireless device to determine a distance between the first location transmitter and the wireless device;
using the time that the second packet was transmitted from the second location transmitter and the time that the second packet was received at the wireless device to determine a distance between the second location transmitter and the wireless device; and
using the time that the third packet was transmitted from the third location transmitter and the time that the third packet was received at the wireless device to determine a distance between the third location transmitter and the wireless device.

21. The method of claim 20, further comprising:
using the distance between the first location transmitter and the wireless device, the distance between the second location transmitter and the wireless device, the distance between the third location transmitter and the wireless device, and the locations of the location transmitters to compute a location of the wireless device.

22. The method of claim 16, wherein the location of the wireless device is in two dimensions.

23. The method of claim 16, further comprising:
wirelessly receiving from a fourth location transmitter a fourth packet that includes a location of the fourth location transmitter and a time that the fourth packet was transmitted by the fourth location transmitter; and
using the locations received from the first, second, third and fourth location transmitters to compute a location of the wireless device, wherein the location of the wireless device is in three dimensions.

24. The method of claim 16, wherein the second and third location transmitters are located within the enclosure.

25. The method of claim 16, wherein the wireless device and the location transmitters communicate using a wireless local area network (WLAN) protocol.

26. The method of claim 16, wherein one of the location transmitters is a wireless local area network (WLAN) access point.

27. The method of claim 16, wherein one of the location transmitters is a wireless local area network (WLAN) access point, and wherein the wireless device is associated with the WLAN access point.

28. The system of claim 16, wherein the wireless device is a mobile phone, a two-way radio, a two-way pager or a computer.

* * * * *

UNITED STATES PATENT AND TRADEMARK OFFICE
CERTIFICATE OF CORRECTION

PATENT NO.      : 7,603,128 B1  
APPLICATION NO. : 10/457603  
DATED           : October 13, 2009  
INVENTOR(S)     : Jones et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Fifth Day of October, 2010

David J. Kappos
*Director of the United States Patent and Trademark Office*